US009486772B1

(12) United States Patent
Lebron-Colon et al.

(10) Patent No.: US 9,486,772 B1
(45) Date of Patent: Nov. 8, 2016

(54) METHODS OF FUNCTIONALIZATION OF CARBON NANOTUBES BY PHOTOOXIDATION

(75) Inventors: Marisabel Lebron-Colon, N. Ridgeville, OH (US); Michael A. Meador, Strongsville, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 245 days.

(21) Appl. No.: 12/870,475

(22) Filed: Aug. 27, 2010

(51) Int. Cl.
*B01J 19/12* (2006.01)
*C01B 31/00* (2006.01)
*C01B 31/02* (2006.01)
*B82Y 40/00* (2011.01)

(52) U.S. Cl.
CPC ............ *B01J 19/123* (2013.01); *B01J 19/127* (2013.01); *C01B 31/0273* (2013.01); *B82Y 40/00* (2013.01)

(58) Field of Classification Search
CPC .. B01J 19/123; B01J 19/127; C01B 31/0273
USPC ..................................... 204/157.44
See application file for complete search history.

(56) References Cited

U.S. PATENT DOCUMENTS

| | | | |
|---|---|---|---|
| 4,315,998 A | 2/1982 | Neckers et al. | |
| 4,436,715 A * | 3/1984 | Schaap et al. | 204/157.5 |
| 6,774,249 B2 | 8/2004 | Akhavan-Tafti et al. | |
| 7,122,165 B2 * | 10/2006 | Wong et al. | 977/748 |
| 7,125,533 B2 * | 10/2006 | Khabashesku et al. | 977/748 |
| 7,452,828 B2 * | 11/2008 | Hirakata et al. | 977/749 |
| 7,597,868 B2 | 10/2009 | Senna et al. | |
| 8,231,854 B2 * | 7/2012 | Kajiura et al. | 977/845 |
| 2002/0127169 A1 * | 9/2002 | Smalley et al. | 204/157.41 |
| 2007/0292622 A1 * | 12/2007 | Rowley et al. | 977/845 |
| 2008/0308407 A1 | 12/2008 | Rostovtsev et al. | |
| 2009/0060815 A1 * | 3/2009 | Wong et al. | 977/748 |
| 2009/0087543 A1 | 4/2009 | Nicholas | |
| 2009/0142581 A1 * | 6/2009 | Heintz et al. | 977/742 |
| 2010/0044230 A1 | 2/2010 | Papadimitrakopoubs et al. | |

OTHER PUBLICATIONS

Hamon et al, "Reacting soluble single-walled carbon nanotubes with singlet oxygen," Chem. Phys. Lett. 447 (2007), pp. 1-4.*
Furtado et al, "Debundling and Dissolution of Single-Walled Carbon Nanotubes in Amide Solvents," J. Am. Chem. Soc. 2004, vol. 126, pp. 6095-6105.*
Lebron-Colon et al, "Surface oxidation study of single wall carbon nanotubes," Abstracts of Papers, 239th ACS National Meeting, San Francisco, CA, United States, Mar. 21-25, 2010.*
Lebron-Colon et al, "Photo-oxidation of single-wall carbon nanotubes," Abstracts of Papers, 232nd ACS National Meeting, San Francisco, CA, United States, Sep. 10-14, 2006.*
Linden et al, "Type I and Type II Sensitizers Based on Rose Bengal Onium Salts," Photochemistry and Photobiology vol. 47, No. 4, pp. 543-550, 1988 (Pergamon Press).*
Savage et al, "Photoinduced oxidation of carbon nanotubes," J. of Phys.: Condens. Matter 15 (2003) pp. 5915-5921.*
Zhang et al, "Oxidation of Zigzag Carbon Nanotubes by Singlet O2; Dependence on the Tube Diameter and the Electronic Structure," J. Phys. Chem. B 2004, vol. 108, pp. 11435-11441.*
Giordani et al, "Debundling of Single-Walled Nanotubes by Dilution; Observation of Large Populations of Individual Nanotubes in Amide Solvent Dispersions," J. Phys. Chem. B 2006, vol. 110, pp. 15708-15718.*
Ausman et al, "Organic Solvent Dispersions of Single-Walled Carbon Nanotubes: Toward Solutions of Pristine Nanotubes," J. Phys. Chem. B, vol. 104, No. 38, Sep. 28, 2000, pp. 8911-8915.*
"Surface tension values of some common test liquids for surface energy analysis," available on-line at http://www.surface-tension.de/ (date N/A).*
Escobar et al, "Purification and Functionalization of Carbon Nanotubes by Classical and Advanced Oxidation Processes," J. of Nanoscience and Nanotechnology, vol. 9, pp. 6228-6233, 2009.*
Micheal A. Meador and Marisabel LeBron, "New Method Developed to Purify Single Wall Carbon Nanotubes for Aerospace Applications", NASA-GRC (2003). http://ntrs.nasa.gov/archive/nasa/casi.ntrs.nasa.gov/20050214722_2005217079.pdf.
M.A. Meador, "Nanocomposites for Aerospace Applications" in Industry Guide to Nanocomposites, G.R. Baeyer, ed. AMI, Ltd., Bristol, UK, in press.
Pavel Nikolaev, et al., "Gas-Phase Catalytic Growth of Single-Walled Carbon Nanotubes from Carbon Monoxide", Chem. Phys. Lett., vol. 313, Nos. 1-2, pp. 91-97 (1999).
I.W. Chiang, et al., "Purification and Characterization of Single-Wall Carbon Nanotubes (SWNTs) Obtained from the Gas-Phase Decomposition of CO (HiPco Process)", J. Phys. Chem. B., vol. 105, No. 35, pp. 8297-8301 (2001).

* cited by examiner

*Primary Examiner* — Keith Hendricks
*Assistant Examiner* — Colleen M Raphael
(74) *Attorney, Agent, or Firm* — Robert H. Earp, III

(57) ABSTRACT

A method of photooxidizing carbon nanotubes, such as single-walled and multi-walled carbon nanotubes. The nanotubes are purified and dispersed in a solvent, such as n-methyl pyrrolidinone or dimethylformamide. A singlet oxygen sensitizer like Rose Bengal is added to the solution. Oxygen gas is continuously supplied while irradiating the solution while irradiating the solution with ultraviolet light to produce singlet oxygen to oxidize the single-walled carbon nanotubes. Advantageously, the method significantly increases the level of oxidation compared with prior art methods.

22 Claims, No Drawings

METHODS OF FUNCTIONALIZATION OF CARBON NANOTUBES BY PHOTOOXIDATION

ORIGIN OF THE INVENTION

The invention described herein was made by employees of the United States Government and may be manufactured and used by or for the Government for Government purposes without the payment of any royalties thereon or therefore.

BACKGROUND OF THE INVENTION

1. Field of the Invention

The invention relates to oxidation of carbon nanotubes. Specifically, the invention relates to photooxidation of carbon nanotubes, such as single-walled carbon nanotubes.

2. Background of the Disclosure

A fullerene is any molecule composed entirely of carbon. Fullerenes are frequently in the form of a hollow sphere, cylinder, ellipsoid or a tube. Cylindrical fullerenes are called carbon nanotubes. Since the discovery of carbon nanotubes and later single-wall carbon nanotubes, research has been conducted to exploit their unique mechanical, electrical, and thermal properties to create multifunctional composite materials. One such property is that carbon nanotubes have a substantially longer length than diameter. Specifically, single-wall nanotubes ("SWCNTs") have a length that can be a million times larger than its diameter. In addition, SWCNTs may have a tenfold higher tensile strength and a fivefold higher Young's modulus than conventional carbon fibers. Actually, research has shown that single-wall carbon nanotubes have the highest conductivity of any known fiber, a higher thermal conductivity than diamond, and the highest stiffness of any known fiber.

As a result of these exceptional properties, the addition of carbon nanotubes into polymers can significantly increase mechanical, electrical and thermal properties. Clearly, use of carbon nanotubes as primary or secondary reinforcements in polymers or ceramics could lead to new materials with significantly enhanced mechanical strength and electrical and thermal conductivity. Use of carbon-nanotube-reinforced materials in aerospace components, for example, will enable substantial reductions in component weight and improvements in durability and safety. Potential applications for single wall carbon nanotubes include lightweight components for vehicle structures and propulsion systems, fuel cell components (bipolar plates and electrodes) and battery electrodes, and ultra-lightweight materials for use in solar sails.

However, dispersion of carbon nanotubes, such as a SWCNTs, in a given polymer matrix can be problematic. Pure SWCNTs tend to "rope up" due to strong Van der Waals attractive forces and, as a result, are not readily dispersed in organic solvents. Instead, SWCNTs tend to agglomerate in a polymer matrix. In addition, strong interfacial bonding between the SWCNTs and the polymer matrix is essential to deriving materials with enhanced electrical, thermal and mechanical properties.

Accordingly, the key to the use of carbon nanotubes as polymer additives is to develop the proper functionalization chemistry that enables dispersion of carbon nanotubes into the polymer matrix without adversely affecting the chemical structure and beneficial properties of the carbon nanotubes. Specifically, functionalizing carbon nanotubes enhances their ability to be incorporated into polymer matrices and enhances their bonding with the matrix. A variety of chemistries have been developed to functionalize carbon nanotubes. One approach to carbon nanotube functionalization is to oxidize the end and side wall carbons, typically by treatment with a strong oxidizing agent or refluxing in strong acids. However, this approach can damage the tubes, leading to the introduction of defects. Specifically, defects can be introduced into the side-walls of the nanotubes, changing the carbon-carbon bonds from $sp^2$ to $sp^3$ hybridization, and reducing the electrical and thermal conductivities. In addition, strong oxidizing agents or refluxing in strong acids can cause the carbon nanotubes to be "cut" to smaller lengths. Reducing length of the carbon nanotubes by cutting reduces their aspect ratio and negatively impacts their mechanical properties and efficacy as a reinforcement in polymers. In addition, the chemicals used to oxidize the SWCNT are hazardous and have a negative impact on the environment. An approach to functionalizing carbon nanotubes, such as SWCNTs, which maintains their length to diameter ratio and/or reduces environmental impact, is desirable.

SUMMARY OF THE INVENTION

In an embodiment, the present invention relates to a method of functionalizing a carbon nanotube comprising dispersing the carbon nanotube in a polar solvent; saturating the polar solvent with oxygen gas; adding a singlet oxygen sensitizer to the solvent; and irradiating the solvent to functionalize the carbon nanotube.

In another embodiment, the present invention relates to a method of functionalizing a single-walled or multi-walled carbon nanotube comprising dispersing the carbon nanotubes in a polar solvent; saturating the solvent with oxygen gas; adding a singlet oxygen sensitizer to the polar solvent; and irradiating the polar solvent under ultraviolet light until a predetermined level of oxidation of the carbon nanotubes occurs.

In yet another embodiment, the present invention relates to a method of functionalizing a single-walled carbon nanotube comprising purifying the single-walled carbon nanotubes to decrease iron content; dispersing the single-walled carbon nanotubes in a solvent of n-methyl pyrrolidinone or dimethylformamide; adding a predetermined amount of Rose Bengal to the solution; continuously supplying oxygen gas to the solution; and irradiating the solution with ultraviolet light to produce singlet oxygen and oxidize the single-walled carbon nanotubes.

DETAILED DESCRIPTION

Embodiments of a novel method for oxidizing carbon nanotubes are generally described. While certain embodiments may include specific compositions, time periods, weight percentages, compositions, or materials, the appended claims should only be limited by the composition coating described therein and interpreted independently of the specific embodiments described herein.

Carbon nanotubes may be dispersed in a suitable solvent, such as a solvent that permits aggregate assemblies and/or macromolecular complexes. For example, an organic solvent and/or a highly polar solvent having a high surface tension may be preferable, such as water, ethanol, acetone, and dimethylformamide. One exemplary example identified is n-methyl pyrrolidinone.

In an embodiment, carbon nanotubes, such as SWCNTs or multi-walled carbon nanotubes, may be dispersed in the solvent resulting in a suspension. For example, about 100 milligrams ("mg") carbon nanotubes may be dispersed for every about 150-200 milliliters ("mL") of the suitable solvent, such as dimethylformamide or n-methyl pyrrolidinone. A person having ordinary skill in the art will appreciate other concentrations of carbon nanotubes in the solvent may be used within the spirit of the invention. For example, the amount of carbon nanotubes per solvent may be in the ranges of 0.25 mg/mL-15 mg/ML, 0.35 mg/mL-0.75 mg/mL, 0.3 mg/mL-0.67 mg/mL.

The carbon nanotubes may be in solid form and may be purified prior to dispersing in the suitable solvent. Purifying the carbon nanotubes preferably decreases content of iron particles and amorphous carbon to improve oxidation. The carbon nanotubes may be purified by any technique or method known to a person having ordinary skill in the art. One purification example includes a gas-phase purification technique involving a combination of high-temperature oxidations and repeated extractions with an acid, such as nitric and hydrochloric acid. The procedure significantly reduces the amount of impurities, such as catalyst and non-nanotube forms of carbon, within the nanotubes. As a result, the carbon nanotubes may exhibit increased stability. The onset of decomposition of the purified nanotubes may be more than 300° C. higher than that of the crude carbon nanotubes. Transmission electron microscopy analysis of nanotubes purified by this method has revealed complete removal of iron catalyst particles. Analysis of the nanotubes using inductively coupled plasma spectroscopy revealed that the iron content of the nanotubes may be reduced from about 22.7 wt % in the crude nanotubes to less than about 0.02 wt %. X-ray photoelectron spectroscopy revealed a decrease in iron content after purification as well as an increase in oxygen content due to the formation of carboxylic acid groups on the surface of the nanotubes. Accordingly, purification of the carbon nanotubes may be advantageous prior to oxidation.

Next, the suspension may be saturated with an oxidizing agent, such as oxygen gas. In a preferred embodiment, pure oxygen gas is used as an oxidizing agent. Other oxidizing agents may be used as will be appreciated by a person having ordinary skill in the art.

A singlet oxygen sensitizer may be added to the mixture and irradiated to produce singlet oxygen. Singlet oxygen is a diamagnetic form of molecular oxygen less stable than normal triplet oxygen. Singlet oxygen is a highly reactive species and is known to add to a variety of aromatic carbons. Singlet oxygen may be prepared by any method known to a personal having ordinary skill in the art. For example, singlet oxygen may be prepared by irradiating an oxygen saturated solution with ultraviolet light in the presence of a sensitizer. Irradiation of an oxygen saturated solution of C60, a fullerene which is also a known singlet oxygen sensitizer, has been shown to produce its monoepoxide. Attempts to increase the amount of oxygen functionality in C60 by increasing the reaction time has proved unsuccessful, likely due to the fact that the monoepoxide of C60 no longer functions as a singlet oxygen sensitizer. Attempts to photooxidize SWCNT in the absence of a singlet oxygen sensitizer produced low oxygen incorporation, such as about 3 atomic weight percent. Instead, the present method disclosed herein results in significantly more oxygen incorporation.

Unexpectedly, the singlet oxygen sensitizer used may comprise dye molecules, such as methylene blue, porphyrins, or preferably Rose Bengal. The Rose Bengal is a solid powder that may be diluted before being added to the heterogeneous solution of carbon nanotubes, such as the SWCNTs. The concentration of the Rose Bengal may be about 100 mg diluted in 15 mL. Of course, other concentrations may be used as will be appreciated by those having ordinary skill in the art. For example, the concentration of Rose Bengal may be diluted to at least 80 milligrams for every 15 milliliters and as much as about 120 milligrams per about 15 milliliters.

The resulting mixture may be irradiated until a predetermined level of oxidation occurs. The amount, duration and wavelength of the ultraviolet light may be dependent upon the amount and/or concentration of the solution. In an embodiment, a 450-watt ultraviolet, medium pressure, quartz, mercury-vapor lamp is utilized. The wavelength of the ultraviolet light may be in the range from about 200 nanometers to about 400 nanometers. For example, during the step of irradiating the solution, the range of the ultraviolet light may be controlled to a range of about 200 nanometers to about 400 nanometers, or about 320 nanometers to about 400 nanometers, or any range in between 200 to 400 nanometers. High energy low wavelength radiation may be prevented or at least the amount of such radiation may be limited from interacting with the solution by use of a filter, such as a gas filter. For example, one such filter may be Pyrex. Upon a predetermined level of oxidation, the resulting oxidized tubes may be recovered by filtering the suspension. The recovered oxidized carbon nanotubes may be washed to remove adsorbed solvent, and/or dried in a vacuum oven.

In an embodiment, SWCNTs, which may be previously purified, are dispersed in the suitable solvent, such as n-methyl pyrrolidinone or dimethylformamide. For example, about 100 milligrams of SWCNTs are dispersed for every about 150-200 mL of the suitable solvent. Ultrasonication may be utilized to improve the dispersion. The resulting suspension is saturated with oxygen gas. A singlet oxygen sensitizer, such as Rose Bengal, is added and the resulting mixture is irradiated under a continuous flow of oxygen. The Rose Bengal may be diluted before being added to the solution, such as about 100 milligrams diluted into about 15 milliliters.

The resulting mixture may be irradiated until a predetermined level of oxidation occurs in the SWCNTs, for example 18-24 hours. The ultraviolet light may be the catalyst in the reaction. In this embodiment, a 450-watt ultraviolet, medium pressure, quartz, mercury-vapor lamp is utilized. The wavelength of the ultraviolet light may be in the range from about 200 nanometers to about 400 nanometers. A glassware filter may be used to control the wavelength range to prevent high-energy low wavelength radiation from reaching the photo chemical substrate. For example, the glassware filter may control the wavelength in the range from about 320 nanometers to 400 nanometers.

Advantageously, chemical analysis by Fourier Transform-infrared spectroscopy and X-ray photoelectron spectroscopy unexpectedly revealed that the oxygen content of the photooxidized SWCNTs was 11.3 atomic percent, compared to 6.7 atomic percent for SWCNTs oxidized by treatment with refluxing acid. Therefore, the unexpected and advantageous results provide a step change over known methods of oxidation of carbon nanotubes. The photooxized SWCNTs produced by this method can be used directly in various polymer matrixes or can be further modified by chemical reactions at the oxygen functional groups and then used as additives. This method may also be suitable for use in oxidation of multiwall carbon nanotubes and graphenes.

The method of photoxidation of carbon nanotubes described herein is more benign than conventional oxidation approaches for SWCNTs. Advantageously, the levels of oxygen incorporated using this method is nearly twice that obtained by conventional oxidation methods. Moreover, this method does not require the use of toxic oxidizing agents or corrosive acids.

Carbon nanotubes, both single and multiwall, can be used as additives to polymers to enhance their mechanical, electrical and thermal properties. Potential applications include multifunctional materials for aircraft structures to mitigate lightning strikes, lightweight materials for automotive applications, and composite materials for sporting goods.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentability and novelty which reside in the invention, including all the features and embodiments which would be treated as equivalents thereof by those skilled in the art to which the invention pertains.

The invention claimed is:

1. A method of functionalizing a carbon nanotube comprising:
   dispersing the carbon nanotube in a polar solvent with a high surface tension
   saturating the polar solvent with an oxidizing agent; and
   irradiating the polar solvent to functionalize the carbon nanotube.

2. The method of claim 1 wherein the step of saturating the polar solvent comprises saturating the polar solvent continuously with oxygen gas.

3. The method of claim 2 further comprising adding a singlet oxygen sensitizer to the polar solvent.

4. The method of claim 1 further comprising purifying the carbon nanotube prior to the step of dispersing the carbon nanotube in the polar solvent.

5. The method of claim 1 wherein the step of irradiating the polar solvent comprises supplying ultraviolet light in a range of 200 nanometers to 400 nanometers.

6. The method of claim 1 wherein the step of irradiating the polar solvent comprises filtering high energy, low wavelength radiation from interacting with the polar solvent.

7. The method of claim 1 wherein the oxidizing agent is oxygen gas and further comprising adding Rose Bengal to the solution to generate singlet oxygen to oxidize the carbon nanotube.

8. The method of claim 1 where the polar solvent is chosen from the group consisting of n-methyl pyrrolidinone or dimethylformamide.

9. A method of functionalizing a single-walled or multi-walled carbon nanotube comprising:
   dispersing the carbon nanotube in a polar solvent with a high surface tension;
   saturating the polar solvent with oxygen gas;
   adding a singlet oxygen sensitizer to the polar solvent; and
   irradiating the polar solvent under ultraviolet light until a predetermined level of oxidation of the carbon nanotube occurs.

10. The method of claim 9 wherein the polar solvent is n-methyl pyrrolidinone or dimethylformamide.

11. The method of claim 10 wherein the singlet oxygen sensitizer is Rose Bengal.

12. The method of claim 10 wherein the step of the step of irradiating the polar solvent includes filtering high energy, low wavelength radiation from interacting with the solution.

13. The method of claim 10 further comprising controlling the wavelength range of the ultraviolet light to a range of about 200 nanometers to about 400 nanometers.

14. The method of claim 9 wherein the carbon nanotube is purified prior to dispersing the carbon nanotube in the polar solvent.

15. The method of claim 9 where the polar solvent is chosen from the group consisting of n-methyl pyrrolidinone or dimethylformamide.

16. A method of functionalizing a single-walled carbon nanotube comprising:
   purifying the single-walled carbon nanotube to decrease iron content;
   dispersing the single-walled carbon nanotube in a solvent with a high surface tension;
   adding a predetermined amount of Rose Bengal to the solution; continuously supplying oxygen gas to the solution; and
   irradiating the solution with ultraviolet light to produce singlet oxygen and oxidize the single-walled carbon nanotube.

17. The method of claim 16 further comprising controlling the wavelength range of the ultraviolet light to a range of about 200 nanometers to about 400 nanometers.

18. The method of claim 17 wherein the wavelength range is about 320-400 nanometers.

19. The method of claim 16 wherein at least 1 milligram of carbon nanotubes is added for every 200 milliliters of the solvent and less than 2 milligrams for every 200 milliliters of the solvent.

20. The method of claim 16 wherein the step of irradiating includes filtering high energy, low wavelength radiation from interacting with the solution.

21. The method of claim 16 further comprising diluting the Rose Bengal to a solution of at least 80 milligrams for every 15 milliliters of solvent and as much as about 120 milligrams per about 15 milliliters of solvent.

22. The method of claim 16 where the solvent with a high surface tension is chosen from the group consisting of n-methyl pyrrolidinone or dimethylformamide.

* * * * *